No. 653,821. Patented July 17, 1900.
G. SCHOCK.
APPARATUS FOR WASHING BARRELS.
(Application filed Nov. 2, 1899.)
(No Model.) 3 Sheets—Sheet 1.
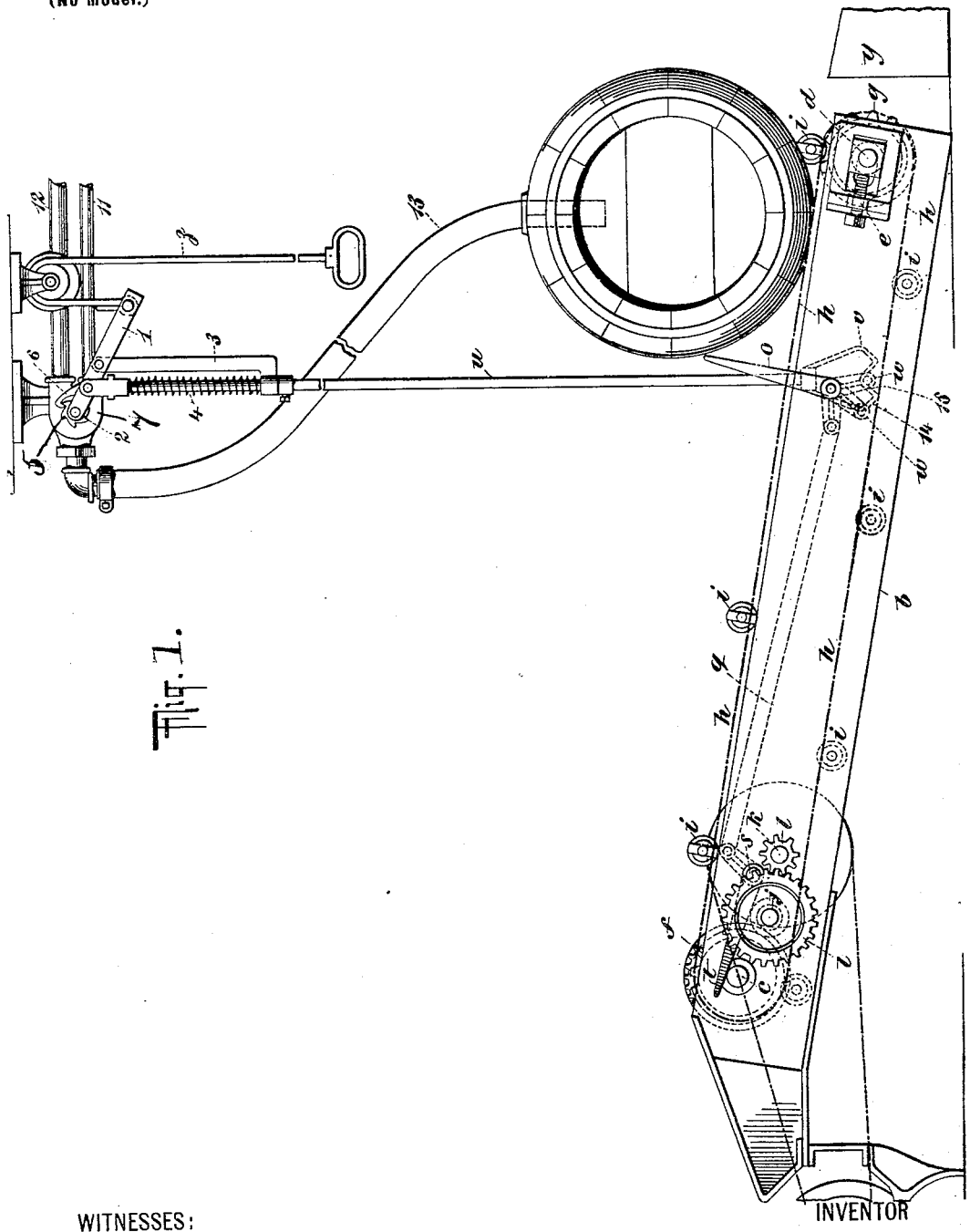
WITNESSES:
Gustave Dieterich
Geo. E. Morse
INVENTOR
Gustav Schock
BY Briesen & Knauth
ATTORNEYS
THE NORRIS PETERS CO., PHOTO-LITHO., WASHINGTON, D. C.

No. 653,821. Patented July 17, 1900.
G. SCHOCK.
APPARATUS FOR WASHING BARRELS.
(Application filed Nov. 2, 1899.)
(No Model.) 3 Sheets—Sheet 2.
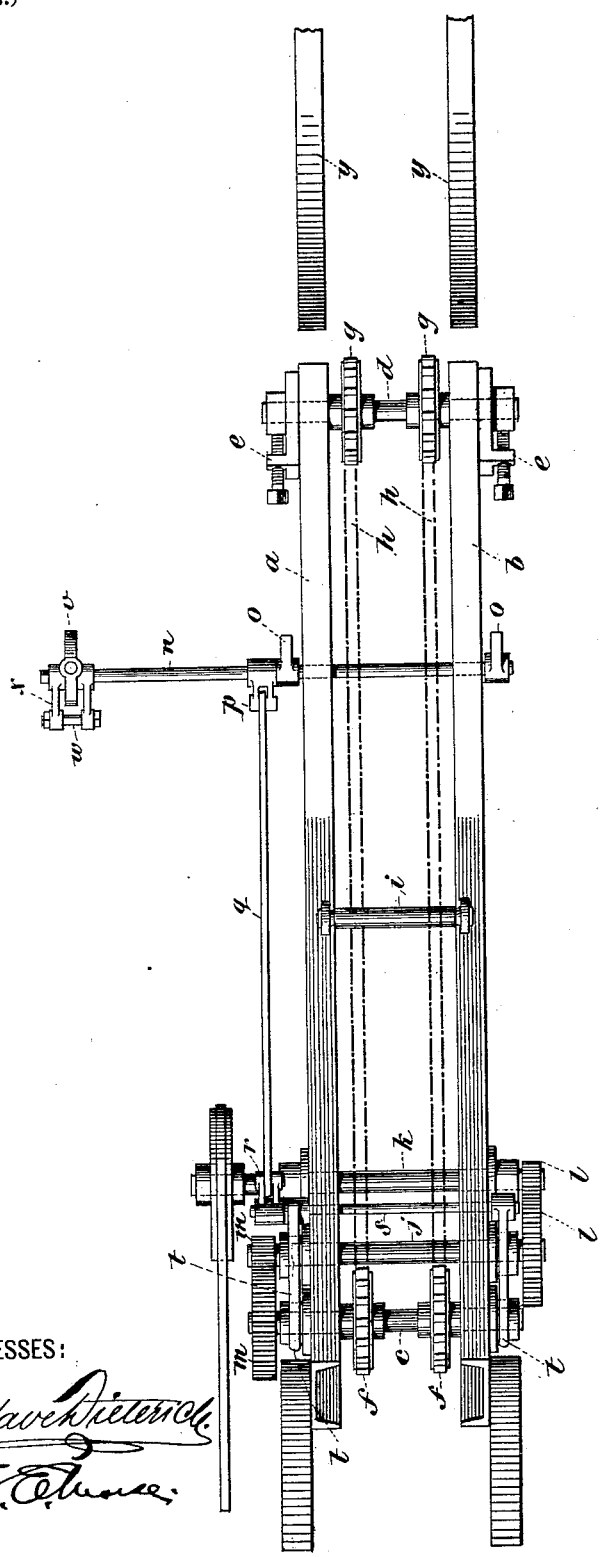
WITNESSES:
INVENTOR
Gustav Schock
BY Briesen & Knauth
ATTORNEYS No. 653,821. Patented July 17, 1900.
G. SCHOCK.
APPARATUS FOR WASHING BARRELS.
(Application filed Nov. 2, 1899.)
(No Model.) 3 Sheets—Sheet 3.
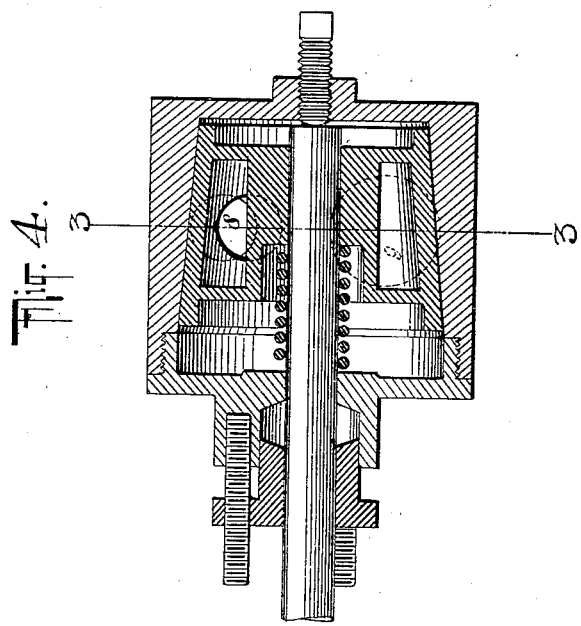
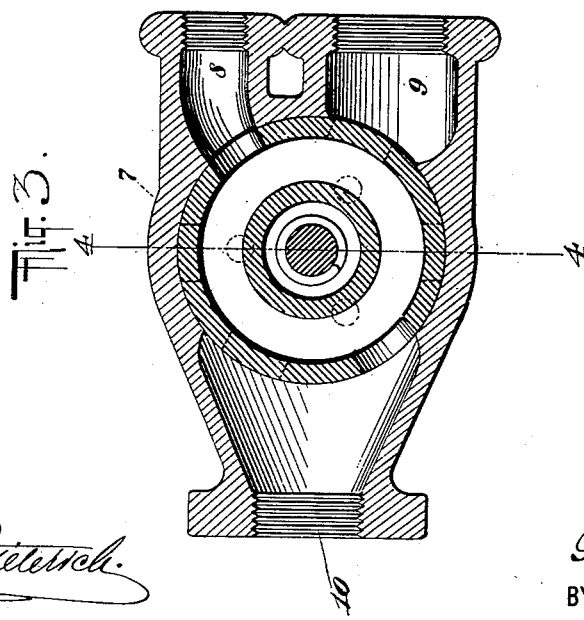
WITNESSES:
INVENTOR
Gustav Schock
BY
ATTORNEYS

UNITED STATES PATENT OFFICE.

GUSTAV SCHOCK, OF NEW YORK, N. Y.

APPARATUS FOR WASHING BARRELS.

SPECIFICATION forming part of Letters Patent No. 653,821, dated July 17, 1900.

Application filed November 2, 1899. Serial No. 735,581. (No model.)

*To all whom it may concern:*

Be it known that I, GUSTAV SCHOCK, a citizen of the United States, residing in the city, county, and State of New York, have invented certain new and useful Improvements in Apparatus for Washing Barrels, of which the following is a specification.

My invention relates to barrel-washing apparatus, and has for its object to produce an efficiently-acting automatic apparatus wherein the barrels may be efficiently washed.

In the accompanying drawings I have shown by way of illustration an apparatus in which my invention is embodied. It will be understood, however, that this apparatus is illustrative merely and that my invention is not limited to the apparatus shown.

In the drawings, Figure 1 represents a side elevation of one form of the washing and transporting apparatus in which my invention is embodied. Fig. 2 is a plan view of the structure shown in Fig. 1; and Figs. 3 and 4 are sectional views of the inlet-valve for the steam and water, the operation of which will be fully described, the section shown in Fig. 3 being taken on the line 3 3 of Fig. 4 and the section shown in Fig. 4 being taken on the line 4 4 of Fig. 3.

The automatic transporting apparatus to transport the keg or barrel and to automatically effect the steaming and filling thereof is shown in Figs. 1 and 2, and, as shown, consists of a pair of side bars $a$ $b$, in which are journaled a pair of shafts $c$ $d$, one of these shafts being preferably provided with adjusting devices $e$. The shaft $c$ carries sprocket-wheels $f$, and the shaft $d$ carries sprocket-wheels $g$, around which wheels pass suitable chains $h$, which are preferably connected by cross-bars $i$, the sprocket-chains $h$ supporting the kegs which rest against the cross-bars $i$, so as to be propelled by the sprocket-chains. The shaft $c$ is preferably driven from a counter-shaft $j$ by a driven shaft $k$ through the medium of suitable gearing $l$ $m$. The movement of the sprocket-chains is a simultaneous continued movement in harmony with the continuous movement of the driven shaft $k$.

$n$ is a suitable rock-shaft provided with a trip or detector-bar lever $o$ at each side of the apparatus and with a crank or arm $p$, which is connected by a link $q$ with a similar arm $r$ on a shaft $s$, likewise provided with a pair of trips or detector-bars $t$, similar to the trips or detector-bars $o$, carried by the shaft $n$.

$u$ is a rising-and-falling valve-operating rod provided at its lower end with a cam $v$, with which rollers $w$ on yokes $x$ are adapted to coöperate.

$y$ are suitable runs upon which the kegs may be rolled.

$z$ is a suitable operating connection, herein shown as in the form of a band passing around an overhead pulley and secured to the arm 1, secured to the valve-stem 2 and serving to operate the same. A yoke or arm 3 is pivoted to the arm 1 and is provided with a collar, which embraces the operating-rod $u$, a spring 4 intervening between said collar and the head of the operating-rod. The ratchet 5 is rigidly secured to the valve-stem 2 and is operated upon by a pawl 6, pivoted to the operating-arm 1. The valve-casing 7 is shown herein as provided with several ports, a steam-inlet port 8, a water-inlet port 9, and an outlet-port 10 being shown. It is obvious, however, that instead of employing a single valve for both steam and water a plurality of valves may be employed operated in harmony, as hereinafter described, by the movement of the kegs or barrels. Pipes 11 and 12 (clearly shown in Fig. 1) are provided for bringing steam and hot water, respectively, to the ports 8 and 9. A flexible tube or hose 13 is shown in Fig. 1 as connected to the outlet-port 10 of the valve. It will be noted, however, that for the sake of clearness I have not shown the parts just described in the plan view, Fig. 2.

The operation of this part of my apparatus is as follows: A barrel is brought up the runs $y$ and placed upon the moving carrier constituted by the sprocket-chains in the position shown in Fig. 1. The hose 13 is quickly inserted into the barrel and the handle $z$ pulled downward by the operator. This causes the arm 1 to be swung upward, bringing the pawl forward one tooth, whereupon the operator releases the handle or operating connection $z$, and the weight of the rod $u$ causes the arm

1 to descend, thereby turning the valve-spindle 2 one step and admitting steam to the barrel. As the barrel is carried forward by the carrier it swings the trips or detector-bars o downward, thereby causing the rollers w, carried by the yokes x on the rock-shaft n, to move over the face 14 of the cam v, thereby raising the rod u, and as the barrel continues to move and the rock-shaft to swing the roller w will ride off the incline 14 and the rod will drop, the depressed portion 15 in the cam v dropping down upon the roller w. By this rising-and-falling action of the rod u the ratchet has been rotated another step and hot water is now being admitted to the barrel through the hose 13, the steam having been shut off by the movement of the ratchet. As the barrel rides over the trips or detector-bars and continues along the said barrel will be supplied with water and will come in contact with the detector-bars or trips t, the said detector-bars or trips having been thrown into an elevated position by the depression of the detector-bars or trips o, it being remembered that the said parts are connected by a link q. The barrel in its forward movement will depress the arms or trips t and will thereby reverse the movement of the rock-shaft n, which by reason of the fact that the roller w runs over the cam v will raise and lower the rod u, and thereby shut off the water. Another keg is put in place by the operator, who again pulls down upon the operating connection z, and the keg which has just been operated upon may then be allowed to pass to any other apparatus to be operated upon, such as a scrubbing and sprinkling apparatus.

Having described my invention, what I claim, and desire to secure by Letters Patent, is—

1. In a barrel handling and washing apparatus, the combination of a barrel-transporting apparatus, a fluid-supply pipe adapted to communicate with the barrel on the transporting apparatus and automatic means operated by the movement of the barrel-transporting apparatus for opening and closing the supply to the fluid-supply pipe.

2. In a barrel washing and handling apparatus, the combination of a barrel-transporting apparatus, a fluid-supply pipe adapted to enter the barrel and a valve for controlling the admission of fluid to the said supply-pipe and operated by the movement of a barrel-transporting apparatus.

3. In a barrel washing and handling apparatus, the combination of a barrel-transporting mechanism, a trip or detector-bar, means for supplying the barrel with fluid and means for automatically admitting and shutting off the flow of fluid to the said fluid-supply means and a connection between the trip or detector-bar and the said means for controlling the supply of fluid.

4. In a barrel handling and washing apparatus, the combination of barrel-transporting mechanism, a fluid-supply conduit adapted to deliver fluid to the barrel, means for controlling the flow of fluid to the said fluid-supply conduit and a trip or detector-bar operated by the movement of the barrel-transporting mechanism for controlling the means for controlling the supply of fluid to the barrel.

5. In a barrel handling and washing apparatus, the combination of a pair of sprocket-chains for transporting a barrel, a supply-pipe for bringing a supply of fluid to the said barrel, a valve for controlling the flow of fluid to the supply-pipe and means for controlling the said valve.

6. In a barrel handling and washing apparatus, the combination of a barrel-transporting apparatus, means for bringing a supply of fluid to the barrel carried by the transporting apparatus, a fluid-supply-governing means and means for controlling the fluid-supply comprised in part by a plurality of trips or detector-bars situated at different points of the apparatus and a connection intervening between the said trips or detector-bars, whereby one will be effective, when operated, to restore the other to its initial position and they will be reciprocally effective to restore each other to their initial position.

7. In a barrel washing and handling apparatus, the combination of barrel-transporting mechanism, a plurality of detector-bars or trips located at different points along the line of travel of the barrel, a fluid-supply for the barrel and automatic means for governing the said fluid-supply by the movement of the detector-bars or trips.

8. In a barrel washing and handling apparatus, the combination of barrel-transporting mechanism, means for admitting a supply of steam or water to the said barrel and means for controlling the steam and water supply by the movement of the barrel-transporting mechanism.

9. In a barrel washing and handling apparatus, the combination of a barrel-transporting mechanism with means for supplying the said barrel with fluid, hand-operated apparatus for starting the flow of fluid to the barrel and automatic means for shutting off the supply of fluid to the barrel.

10. In a barrel washing and handling apparatus, the combination of a barrel-transporting mechanism with means for supplying the said barrel with fluid, hand-operated apparatus for starting the flow of fluid to the barrel, automatic means for shutting off the supply of fluid to the barrel and means for operating the said automatic means by the movement of the barrel-transporting mechanism.

11. In a barrel washing and handling apparatus, the combination of a barrel-transporting mechanism with means for supplying the said barrel with fluid, hand-operated apparatus for starting the flow of fluid to the barrel, automatic means for shutting off the supply of fluid to the barrel and a trip or detector-bar in the path of the barrel for shutting off the supply of fluid to the said barrels.

12. In a barrel handling and washing apparatus, the combination of a barrel-transporting mechanism and means for supplying steam and water to the barrel and automatic means for shutting off the supply of steam and water.

GUSTAV SCHOCK.

Witnesses:
OTTO V. SCHRENK,
GEO. E. MORSE.